United States Patent
Seigneret et al.

(10) Patent No.: US 6,970,207 B1
(45) Date of Patent: Nov. 29, 2005

(54) ANTI-FLICKER FILTERING PROCESS AND SYSTEM

(75) Inventors: Franck Seigneret, Rives (FR); Philippe Monnier, Villard Bonnot (FR); Emmanuel Chiaruzzi, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 186 days.

(21) Appl. No.: 09/644,957

(22) Filed: Aug. 23, 2000

(30) Foreign Application Priority Data

Aug. 24, 1999 (FR) .................................. 99 10741

(51) Int. Cl.⁷ ............................................. H04N 5/21
(52) U.S. Cl. ................... 348/607; 348/607; 348/447; 348/606; 348/624; 382/260; 382/261; 345/611
(58) Field of Search ................... 348/910, 607, 348/226.1, 241, 242, 447, 470, 581, 606, 348/608, 612–613, 615, 624, 329.1; 382/260–265, 382/269, 275; 345/611; H04N 5/21

(56) References Cited

U.S. PATENT DOCUMENTS

| | | | | |
|---|---|---|---|---|
| 5,822,008 A | * | 10/1998 | Inoue et al. .................. 348/446 |
| 5,990,965 A | * | 11/1999 | Herz et al. .................... 348/446 |
| 6,061,094 A | * | 5/2000 | Maietta ........................ 348/446 |
| 6,064,437 A | * | 5/2000 | Phan et al. ................... 348/446 |
| 6,067,120 A | * | 5/2000 | Horikawa et al. ............ 348/447 |
| 6,072,530 A | * | 6/2000 | Bril ............................... 348/447 |
| 6,084,568 A | * | 7/2000 | Premi et al. .................. 345/603 |
| 6,094,226 A | * | 7/2000 | Ke et al. ....................... 348/446 |
| 6,189,064 B1 | * | 2/2001 | MacInnis et al. ............ 710/244 |
| 6,219,101 B1 | * | 4/2001 | Sani et al. .................... 348/447 |
| 6,281,933 B1 | * | 8/2001 | Ritter ............................ 348/447 |
| 6,320,619 B1 | * | 11/2001 | Jiang ............................ 348/447 |
| 6,346,970 B1 | * | 2/2002 | Boehlke ....................... 348/447 |
| 6,359,653 B1 | * | 3/2002 | Huang .......................... 348/447 |
| 6,380,985 B1 | * | 4/2002 | Callahan ...................... 348/607 |
| 6,421,097 B1 | * | 7/2002 | O'Rourke et al. ............ 348/607 |
| 6,563,544 B1 | * | 5/2003 | Vasquez ....................... 348/447 |
| 6,577,351 B1 | * | 6/2003 | Yu et al. ....................... 348/624 |

FOREIGN PATENT DOCUMENTS

| | | |
|---|---|---|
| EP | 0 686 941 A1 | 12/1995 |
| EP | 0 751 682 A2 | 1/1997 |
| WO | WO 99/25118 | 5/1999 |

* cited by examiner

*Primary Examiner*—Brian P. Yenke
(74) *Attorney, Agent, or Firm*—Lisa K. Jorgenson; Jose Gutman; Fleit, Kain, Gibbons, Gutman, Bongini & Bianco P.L.

(57) ABSTRACT

A process of filtering digital images to reduce image flicker. An anti-flicker filtering is performed after a step of calculating the image and before a step of displaying the image so that the flicker is filtered as soon as the image is created.

18 Claims, 2 Drawing Sheets

# ANTI-FLICKER FILTERING PROCESS AND SYSTEM

CROSS-REFERENCE TO RELATED APPLICATIONS

This application is based upon and claims priority from prior French Patent Application No. 99-10741, filed Aug. 24, 1999, the entire disclosure of which is herein incorporated by reference.

BACKGROUND OF THE INVENTION

1. Field of the Invention

This invention generally relates to processing of digital images which are displayed on a screen, and more particularly to screen displays for a computer or television screen.

2. Description of the Prior Art

In general, the displaying of computer generated graphics on a low-resolution television screen with interlaced refresh has always presented major technical difficulties without achieving genuinely satisfactory quality for users by reason of a flicker effect. On a television screen of standard type, the refreshing of the lines is performed in an interlaced manner. Stated otherwise, the lines of odd rank are refreshed firstly and the lines of even rank subsequently and so on and so forth. If two consecutive lines exhibit very different brightness levels, the human eye of the user will perceive locally a flicker at a frequency of 50 or 60 hertz according to the television standard adopted. This flicker effect is relatively tiresome and in any event very detrimental to the image quality perceived by the user. In actual fact, it turns out that computer generated images such as graphics, windows or sub-windows typically exhibit strong contrasts from one line to another.

At present, the portable computer and television markets are about to merge, under the driving effect of the development of the Internet and of interactive television which requires associated technologies. It is therefore important to be able to display images with strong contrasts from one line to another such as the pages broadcast by the Internet network, on a standard television screen with visual comfort which is acceptable to the user.

The systems used hitherto to suppress or limit this flicker effect are often referred to as flicker filters. Since the flicker effect is due to the contrast between two consecutive lines, stated otherwise to high frequencies on a vertical column of the image, the basic anti-flicker filter systems implement a low-pass vertical digital filtering. After the filtering, two consecutive lines are closer together in terms of color and the flicker effect is diminished.

The effectiveness of a digital filter is tightly bound to the number of points taken into account. This type of filtering consists in fact in replacing a point or pixel by the average of the neighboring points and the larger the number of points to which the average pertains, the more effective is the filtering. This has an important influence on the slope of the transition between the passing part of the filter and the blocked or filtered part. In most graphics architectures, the data relating to the color of a point or of a pixel are read from a buffer memory according to a horizontal scanning order, this requiring the implementation of a number of line memories equal to n−1 for a filter with n steps, this translating into a very high cost of the line memories whose capacity must be large. These line memories are so expensive because they require large areas of silicon, because the anti-flicker filters are generally three-step, that is to say with storage of two lines, this translating into mediocre filtering performance. In point of fact, the filtering takes place during the steps of displaying the image, this requiring high throughput performance even if the filtering is mediocre.

Conventionally, an ideal filter makes it possible to completely suppress the flicker effect due to high frequencies, whilst preserving the low-frequency image details. Real filters are a compromise between flicker reduction and preservation of image precision. Either the entire image seems to be relatively stable but is scrambled on account of the filter, or the entire image is richer in details but is at risk of flickering. The user can be allowed to adjust the filtering according to the compromise which he deems best.

Accordingly, there exists a need for overcoming the disadvantages of the prior art as discussed above.

SUMMARY OF THE INVENTION

According to a preferred embodiment of the present invention, a preferred implementation will remedy the drawbacks mentioned above.

The subject of the present invention is an economical filtering process using only a reasonable memory size and operating at none too high a throughput.

The process for filtering digital images, according to the invention, is envisaged in particular so as to reduce the image flicker. An anti-flicker filtering is performed after a step of calculating the image and before a step of displaying the said image so that the flicker is filtered as soon as the image is created. Display is thus independent of the throughput of the filter.

Advantageously, an anti-flicker filtering is performed after a step of vertical conversion calculation and before a step of horizontal conversion calculation.

In one embodiment, the anti-flicker filtering is adaptive as a function of a flicker index, so that only zones of the image with strong flicker form the subject of the said anti-flicker filtering.

Advantageously, the anti-flicker filtering is performed after a step of decompacting the image.

The subject of the present invention is also a device for generating digital images, of the type comprising a means of calculating images and a means for displaying images. The device comprises a means of anti-flicker filtering arranged upstream of the means of displaying images so that the flicker is filtered as soon as the image is created.

Advantageously, the means of calculating images is provided with a plurality of line buffer memories, a vertical converter and a horizontal converter.

Advantageously, the means of anti-flicker filtering is arranged between the vertical converter and the horizontal converter.

In one embodiment, the said filtering means comprises a plurality of line buffer memories, and a means for adapting the filtering to local characteristics of the image, so that only zones of the image with strong flicker form the subject of the said anti-flicker filtering.

It is important to consider the way in which the content of the buffer memories is refreshed in a typical graphics subsystem. Most of the time the graphics screen is constructed as a set of rectangular sub-windows which can be moved, magnified, diminished, updated, etc. These operations are performed under the control of software and are applied window after window, generally in a synchronous manner which is relatively slow compared with the speed of refresh of the screen.`

The invention therefore makes it possible to avoid an expensive filter which is applied to the image requiring to be displayed and which from one refresh to another is often retained, which would lead to the same filtering calculations being performed for n consecutive displayed images which are all strictly identical or at least largely so. For animation applications, the customary technique consists in using an architecture with dual buffer memories. The two-dimensional or three-dimensional calculation is performed in one of the buffer memories whilst the other forms the subject of the display. Each time a new image has been calculated, the buffer memories are swapped. The invention makes it possible to include anti-flicker filtering means in the calculation system. An anti-flicker filtering is performed from memory to memory, this having numerous advantages. The real-time constraints of display are thereby circumvented. Filtering performance is not directly related to the speed of processing of a pixel. The same filter can process the images of standard definition as well as the high-definition images.

The passband requirements of the display means remain unchanged. Since the filtering is from memory to memory, the entire device for generating digital images is not forced to follow the standard order of refreshing of the display screen. The amount of memory required for the line buffer memories can thus be reduced significantly. The anti-flicker filtering means need not be duplicated in the case of a global system linked to several graphics display means. The filter can be applied selectively to specific zones of an image.

Graphics subsystems generally include a two-dimensional accelerator which acts as an operator on the rectangular graphical objects such as windows. This accelerator or module for transferring bit blocks and referred to as a "blitter" is used for updating zones of the image, and constitutes the best spot for integrating the anti-flicker filter.

BRIEF DESCRIPTION OF THE DRAWINGS

The present invention will be better understood on studying the detailed description of an embodiment of the invention taken by way of non-limiting example and illustrated by the appended drawings.

DESCRIPTION OF THE PREFERRED EMBODIMENTS

Figure 1:
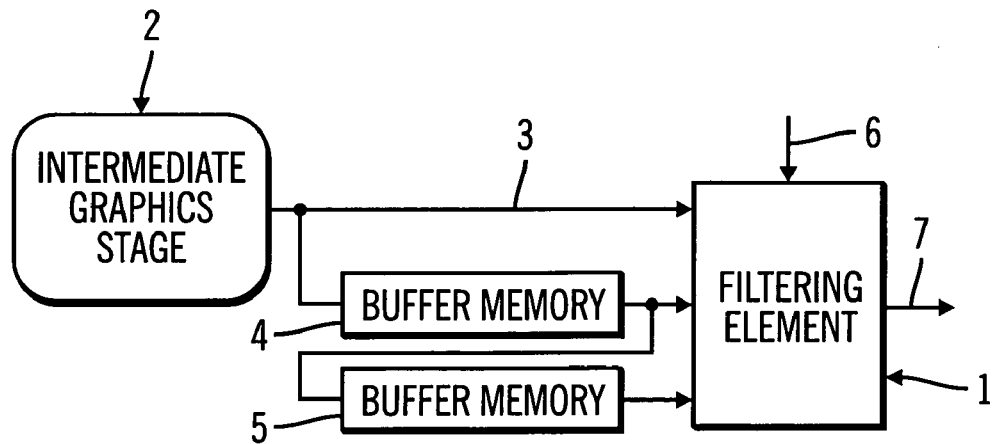
FIG. 1 is a diagrammatic view of a filter according to the prior art.

As may be seen in FIG. 1, a flicker filter of conventional type comprises a filtering element 1 with three steps which is linked to an intermediate graphics stage 2 capable of sending it one after the other, the data relating to the pixels of the lines of the image to be displayed. A link 3 effects a direct connection between the intermediate stage 2 and the filtering element 1. A buffer memory 4 is arranged between the intermediate stage 2 and the filtering element 1 so as to provide the latter with the data relating to the pixel of the line of rank immediately preceding the line, the data of whose pixels are currently being transmitted on the line 3. The output of the buffer memory 4 is linked to the filtering element 1. The buffer memory 4 can also be referred to as a line memory. A buffer memory 5 similar to the buffer memory 4 has its input linked to the output of the buffer memory 4 and its output linked to the filtering element 1 so as to provide the latter with the data relating to the pixels of the antepenultimate line with respect to the line, the data of whose pixels are currently being transmitted on the link 3.

The filtering element 1 also possesses an input 6 via which it receives the filtering coefficients to be used for the image file currently being transmitted by the interface 2. The filtering element 1 furthermore comprises an output 7 which is in general linked to display means (not represented).

It may therefore be seen that such an anti-flicker filter with three steps requires two line buffer memories whilst performing for an image file a filtering which is never other than a rarely satisfactory compromise between the precision of the image displayed and the reduction in the flicker from which it suffers.

Figure 2:
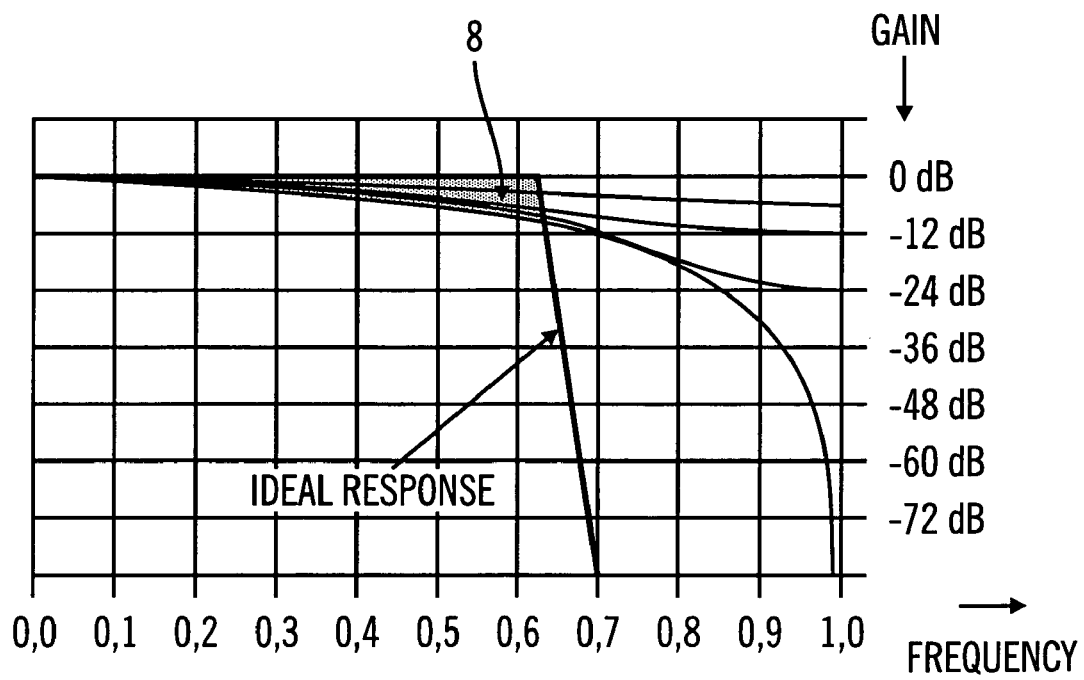
FIG. 2 shows the response curve of a filter according to the prior art and the response curve of an ideal filter.

Plotted in FIG. 2 are various filter response curves in a reference frame with percentage of Nyquist frequency as abscissa and gain in decibels as ordinate. The ideal response curve plotted in bold exhibits a gain of 0 decibels up to a frequency of around 63% of the Nyquist frequency, a gain of less than minus 72 decibels beyond 70% of the Nyquist frequency and a straight-line slope between these two bounds. This ideal response curve would theoretically make it possible to suppress the flicker whilst preserving a non-blurred image of high precision. The four curves drawn normally are referenced by a series of three numbers which is in fact the weight of each line in the filtering. For example, the response curve 32-192-32 is that of a digital filter whose filtering coefficients are coded up to 256 and where and the characteristics of the pixel of the line currently being processed are assigned the weight 192, and the characteristics of the pixel of the preceding line are assigned the weight 32. The same holds for the characteristics of the pixels of the next line. It may be seen that this curve exhibits a gain of the order of minus 6 decibels at 100% of the Nyquist frequency, this being completely inadequate for good filtering. A filter assigned such coefficients will hardly decrease the flicker effect. On the other hand, the curve 64-128-64 exhibits an excellent gain at high frequency but also a gain of the order of minus 10 decibels when it cuts the ideal response curve, thereby occasioning the loss of image details in the hatched zone referenced 8 which is delimited below the curve of the ideal response and above the real response curves. This zone 8 is therefore of maximum area for the curve 64-182-64, this translating into an increase in the blur of the image.

Figure 3:
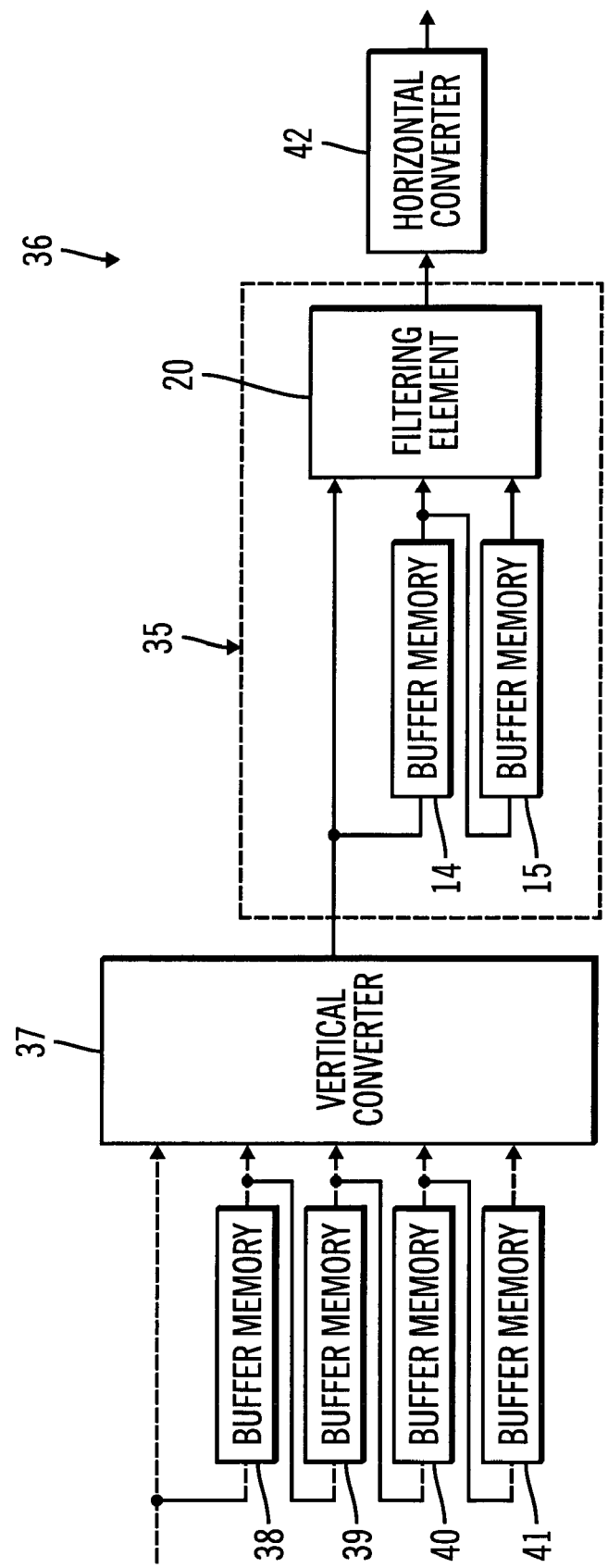
FIG. 3 is a diagrammatic view of a preferred embodiment of the filtering system in accordance with the invention.

In FIG. 3, the references of the elements similar to those of the preceding figures have been increased by the number 10.

The filtering system 35, in accordance with the invention, comprises a three-step filtering element 20 and two buffer memories 14 and 15. The filtering system 35 is here inserted inside a module for transferring blocks of bits 36 also referred to as a blitter which serves in the operations for redimensioning windows and makes it possible to avoid spectral aliasing by carrying out an interpolation of several pixels.

The bit block transfer module 36 comprises, upstream of the filtering system 35, a five-step vertical converter 37 which receives on its five inputs the data relating to the pixels of the current line and those relating to the pixels of the four preceding lines by virtue of four buffer memories 38, 39, 40 and 41 similar to the buffer memories 14 and 15 and arranged in the same manner in order to perform the interpolation of the five bits received simultaneously. The bit block transfer module 36 also comprises a five-step horizontal converter 42 arranged at the output of the filtering system 35. The bit block transfer module 36 allows, in a graphics circuit, acceleration of operation by virtue of the transferring of graphical blocks such as a window in a Windows® environment. This arrangement of the filtering system 35 between the vertical converter 37 and the horizontal converter 42 is particularly beneficial since it makes it possible to process the image such as it is displayed in the columnwise direction, knowing that the flicker effect is almost entirely due to the juxtaposition of pixels exhibiting too high a contrast in one and the same column. The filtering system 35 therefore operates from memory to memory and avoids the reappearance of the flicker phenomenon when the user employs a zoom function which may tend to increase the contrast between two consecutive pixels in one and the same column, by virtue of the fact that the filtering is performed after the vertical conversion.

In other embodiments, provision could be made to arrange the filtering system 35 downstream of the module for transferring bit blocks.

In the example described, the filter works only on three pixels of one and the same column so as to calculate the data relating to a pixel. One could contemplate the use of a filter working on a larger number of pixels, but this would tend to increase the cost of the filter by reason of the necessity to add line buffer memories. It is preferable to use at best one three-step filter comprising just two line memories by virtue of an adaptive strategy which makes it possible to perform filtering as a function of the risks of flicker with dynamic management of the weights of each of the three pixels used for calculating the data of one of them.

The length of the line memory is, preferably, limited to 128 thus benefiting from a two-dimensional resampling system based on the columns. Stated otherwise, the image is sliced into zones whose lines amount to 128 pixels so as to use less memory during filtering. The vertical converter is arranged upstream of the flicker filter. This is because a five-step converter runs the risk of reintroducing flicker. It is therefore advantageous to perform the filtering after the vertical conversion. On the other hand, the horizontal converter is arranged downstream of the flicker filter so that the size of the line memories is not affected by the change of horizontal scale. This is possible since the horizontal conversion is a linear operation which produces no additional flicker.

The filtering system has no limitation with respect to the size of the images which can be filtered. By virtue of a considerable throughput, of the order of 100 megapixels per second, it forms an effective solution for high-definition standard television screens. Of course, this system described for two-dimensional images is applicable to three-dimensional images based on a matrix of pixels.

By virtue of the invention, the flicker is filtered as soon as the image is created and the filtered image is then stored in a memory and can be displayed on a screen without undergoing new filterings during display. One thus avoids having to perform a filtering with each refresh of the screen. Such a filtering would be very expensive especially for high-definition at around 2000 pixels per line and at a frequency of the order of 80 to 100 megahertz. Moreover, the filter is compelled to perform the reading of two lines by reason of the interlaced scanning of television screens. Such a filter would occupy a large area of silicon.

On the other hand, according to the invention, one profits from the characteristics of graphical images which are in general relatively stable in the sense that they are used by the user for a duration which may reach several minutes or several tens of minutes. It is therefore especially advantageous to deal with the flicker phenomenon as soon as the image is created. The real-time constraints and speed constraints are circumvented. The screen resolution and the passband constraints are circumvented. The filtering is performed in the order desired. The amount of memory required is divided by a considerable factor, of the order of 16 with respect to filtering taking place during the steps for displaying a high-definition image with 2000 pixels per line. It is possible to use an adaptive filter giving high-quality images with relatively little hardware means, in particular memory.

While there has been illustrated and described what are presently considered to be the preferred embodiments of the present invention, it will be understood by those of ordinary skill in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for filtering digital images, in particular to reduce image flicker, comprises the steps of:
    anti-flicker filtering an image such as it is displayed, after calculating the image;
    storing the anti-flicker filtered image; and
    displaying the stored anti-flicker filtered image so that the flicker of the image is filtered such as it is displayed and as soon as the image is created and then the anti-flicker filtered image is stored before the image is displayed, wherein the anti-flicker filtering is performed in a two-dimensional accelerator blitter module and after a step of vertical conversion calculation of the image and before a step of horizontal conversion calculation of the image, and wherein the stored anti-flicker filtered image is displayed without anti-flicker filtering the stored image.

2. The method of claim 1, wherein the anti-flicker filtering is adaptive as a function of a flicker index, so that only zones of the image with strong flicker form the subject of the said anti-flicker filtering.

3. The method of claim 1, wherein the anti-flicker filtering is performed after a step of decompacting the image.

4. The method of claim 1, in which the anti-flicker filtering is adaptive as a function of a flicker index, so that only zones of the image with strong flicker form the subject of the said anti-flicker filtering.

5. The method of claim 4, wherein the anti-flicker filtering is performed after a step of decompacting the image.

6. The method of claim 1, wherein the anti-flicker filtering is performed on an image stored in memory and before displaying the image.

7. The method of claim 1, wherein the anti-flicker filtering is performed on an image as part of a blitter operation and before displaying the image.

8. The method of claim 1, wherein the stored anti-flicker filtered image is repeatedly displayed from the stored image without anti-flicker filtering the stored image.

9. A device for generating digital images, the device comprising:
    memory means for storing images;
    means for calculating images;
    means for displaying images, communicatively coupled with the memory means; and means for anti-flicker filtering images, communicatively coupled with the memory means, and arranged upstream of the means of displaying images such that the flicker of an image is filtered as soon as the image is created by the means for calculating images and then stored by the memory means before the image is displayed by the means for displaying images, and wherein the anti-flicker filtering is performed in a two-dimensional accelerator blitter module and after a vertical conversion calculation of the image and before a horizontal conversion calculation of the image, and wherein the stored anti-flicker filtered image is displayed without anti-flicker filtering the stored image.

10. The device according to claim 9, wherein the means for anti-flicker filtering comprises a plurality of line buffer memories, and a means for adapting the filtering to local characteristics of the image, so that only zones of the image with strong flicker are the subject of the anti-flicker filtering.

11. The device according to claim 9, wherein the means for calculating images includes a plurality of line buffer memories, a vertical converter, and a horizontal converter.

12. The device according to claim 11, wherein the means for anti-flicker filtering comprises a plurality of line buffer memories, and a means for adapting the filtering to local characteristics of the image, so that only zones of the image with strong flicker are the subject of the anti-flicker filtering.

13. The device according to claim 12, wherein the means for anti-flicker filtering is arranged between the vertical converter and the horizontal converter.

14. The device according to claim 13, wherein the means for anti-flicker filtering comprises a plurality of line buffer memories, and a means for adapting the filtering to local characteristics of the image, so that only zones of the image with strong flicker are the subject of the anti-flicker filtering.

15. A device comprising:
- a memory for storing an image;
- a display interface for displaying the image;
- a two-dimensional accelerator blitter module for performing anti-flicker filtering of the image, and wherein the anti-flicker filtering is performed after a vertical conversion calculation of the image and before a horizontal conversion calculation of the image; and
- an image processor electrically coupled to the memory, to the two-dimensional accelerator blitter module, and to the display interface for anti-flicker filtering an image, and storing the anti-flicker filtered image in the memory before the stored anti-flicker filtered image is coupled to the display interface, and wherein the stored anti-flicker filtered image is displayed without anti-flicker filtering the stored image.

16. The device of claim 15, wherein the image processor adapts the filtering to local characteristics of the image, such that only zones of the image with strong flicker are the subject of the anti-flicker filtering.

17. The device of claim 15, wherein the two-dimensional accelerator blitter module anti-flicker filters an image as part of a blitter operation and before the image is coupled to the display interface.

18. The device of claim 15, wherein the stored anti-flicker filtered image is repeatedly coupled to the display interface for display without anti-flicker filtering the stored image.

* * * * *